US012522791B2

(12) United States Patent
Alsheimer

(10) Patent No.: US 12,522,791 B2
(45) Date of Patent: Jan. 13, 2026

(54) MICROPLATE ASSEMBLY AND METHOD FOR TRANSFERRING SAMPLE BY MEANS OF A MICROPLATE ASSEMBLY

(71) Applicant: Leica Microsystems CMS GmbH, Wetzlar (DE)

(72) Inventor: Soeren Alsheimer, Frankfurt am Main (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 1027 days.

(21) Appl. No.: 17/541,288

(22) Filed: Dec. 3, 2021

(65) Prior Publication Data

US 2022/0195363 A1    Jun. 23, 2022

(30) Foreign Application Priority Data

Dec. 17, 2020  (EP) ..................................... 20215050

(51) Int. Cl.
*C12M 1/32*       (2006.01)
*B01L 3/00*       (2006.01)
(Continued)

(52) U.S. Cl.
CPC ......... *C12M 23/12* (2013.01); *B01L 3/50853* (2013.01); *B01L 3/5635* (2013.01);
(Continued)

(58) Field of Classification Search
CPC ...... C12M 23/12; C12M 23/16; C12M 23/22; C12M 23/38; C12M 23/42; C12M 23/46; B01L 3/50853; B01L 3/5635; B01L 9/50; B01L 2200/04; B01L 2200/141; B01L 2300/168; B01L 2400/0409;
(Continued)

(56) References Cited

U.S. PATENT DOCUMENTS 5,801,055 A      9/1998  Henderson
5,939,024 A  *   8/1999  Robertson ........... B01L 3/50255
                                              422/534

(Continued)

FOREIGN PATENT DOCUMENTS

WO    WO 2019/014541 A2    1/2019
WO    WO 2019/114996 A1    6/2019

*Primary Examiner* — Jill A Warden
*Assistant Examiner* — Jacqueline Brazin
(74) *Attorney, Agent, or Firm* — LEYDIG, VOIT & MAYER, LTD.

(57) ABSTRACT

A microplate assembly for a plurality of samples includes a donor microplate having a plurality of sample donor cavities. The microplate assembly further includes a receiver microplate having a plurality of sample receiver cavities each sample receiver cavity having a transparent receiver bottom configured to enable microscopic imaging. In addition, the microplate assembly includes a leak-tight connecting structure configured to assemble the donor microplate and the receiver microplate, with at least one of the sample donor cavities being in communication with at least one of the sample receiver cavities. Further aspects are a receiver microplate and a leak-tight connecting structure for a microplate assembly as well as a method for transferring samples by means of a microplate assembly.

17 Claims, 11 Drawing Sheets

(51) Int. Cl.
  *B01L 9/00* (2006.01)
  *C12M 1/00* (2006.01)
  *C12M 3/06* (2006.01)

(52) U.S. Cl.
  CPC .............. *B01L 9/50* (2013.01); *C12M 23/16* (2013.01); *C12M 23/22* (2013.01); *C12M 23/38* (2013.01); *B01L 2200/04* (2013.01); *B01L 2200/141* (2013.01); *B01L 2300/168* (2013.01); *B01L 2400/0409* (2013.01)

(58) Field of Classification Search
  CPC ......... B01L 2200/025; B01L 2200/028; B01L 2300/042; B01L 3/5085; B01L 3/5027; G01N 21/01; G01N 21/84
  USPC ..................................................... 435/288.5
  See application file for complete search history.

(56) References Cited

U.S. PATENT DOCUMENTS

| | | | |
|---|---|---|---|
| 9,790,465 B2 | 10/2017 | Bennett et al. | |
| 2005/0280811 A1* | 12/2005 | Sandell | B01L 3/50853 356/246 |
| 2009/0197277 A1 | 8/2009 | Beard et al. | |
| 2009/0203126 A1* | 8/2009 | Hung | B01L 3/502761 435/325 |
| 2014/0322806 A1* | 10/2014 | Bennett | C12M 25/04 435/325 |
| 2019/0249126 A1 | 8/2019 | Mackowiak et al. | |
| 2019/0314812 A1* | 10/2019 | Hickerson | B01L 3/50255 |
| 2021/0155886 A1 | 5/2021 | Schober et al. | |

* cited by examiner

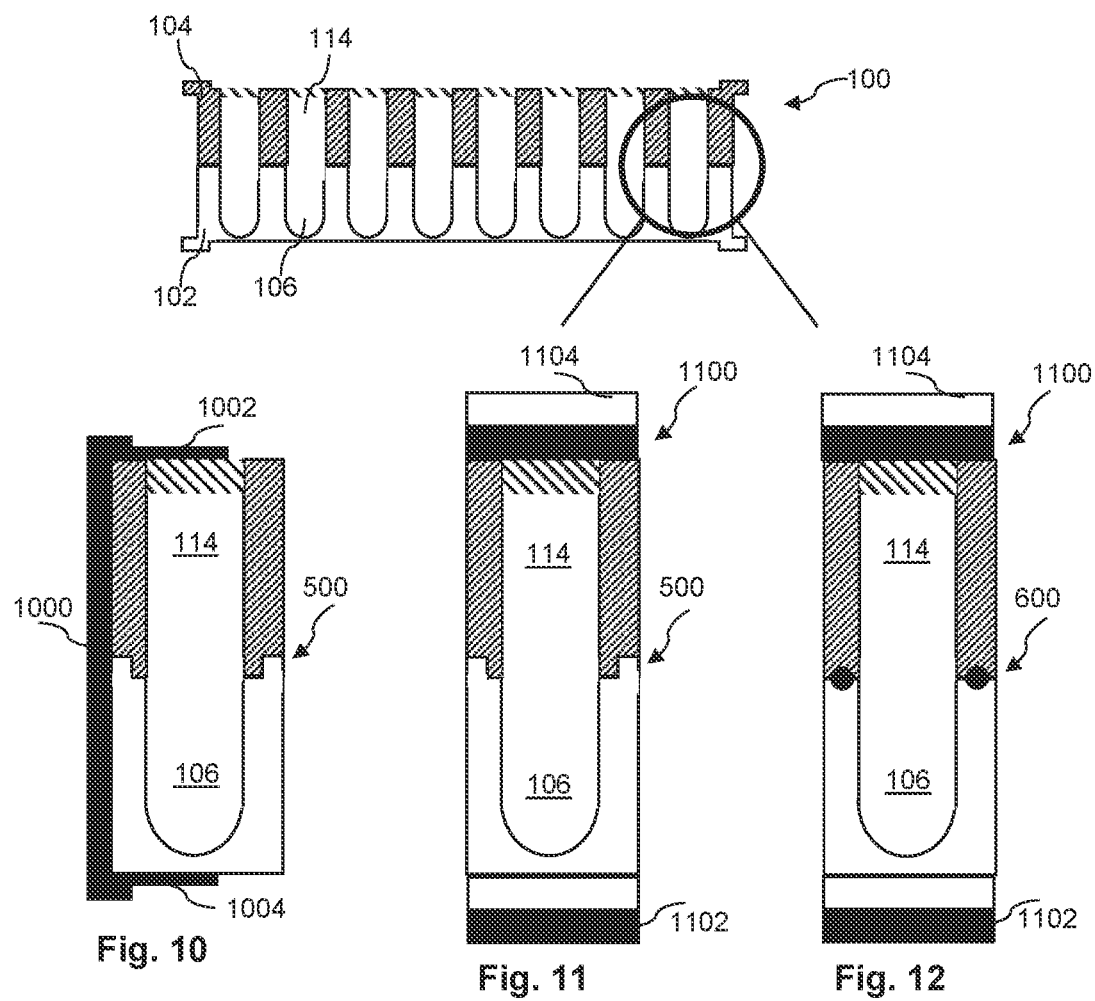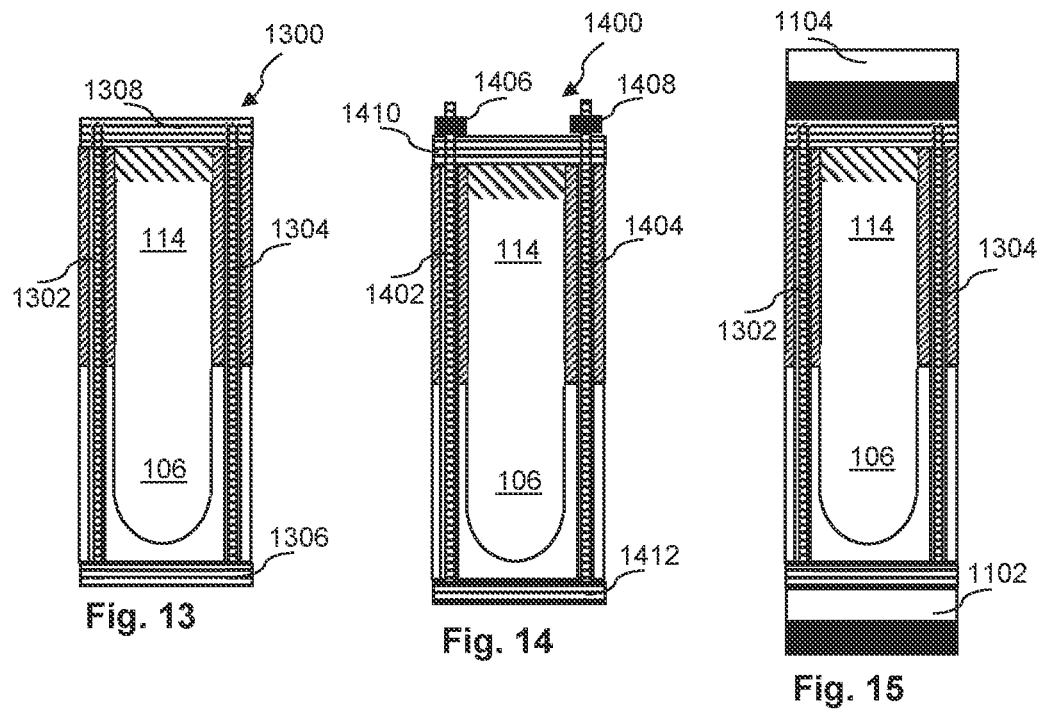
Fig. 10
Fig. 11
Fig. 12
Fig. 13
Fig. 14
Fig. 15

MICROPLATE ASSEMBLY AND METHOD FOR TRANSFERRING SAMPLE BY MEANS OF A MICROPLATE ASSEMBLY

CROSS REFERENCE TO RELATED APPLICATIONS

This application claims benefit to European Patent Application No. EP 20215050.4, filed on Dec. 17, 2020, which is hereby incorporated by reference herein.

FIELD

The invention relates to a microplate assembly, a receiver microplate, a leak-tight connecting structure and a method for transferring samples by means of a microplate assembly.

BACKGROUND

Microplates are frequently used in research and development particularly in the life sciences and pharmaceutical industry. A specific application of microplates is in the fields of high-throughput in vitro cell culture, cell assays and cell analysis. More recently, suspension 3D cell culture methods have been developed that allow culturing of cells and cell clusters, such as spheroids, in microplates. The microplates generally comprise a plurality of cavities for separately culturing the spheroids under differing experimental conditions. Similarly to culturing, cell assays and analysis benefit from the use of microplates by increasing experimental throughput through parallelised high-throughput workflows. Often, these cell assays and analyses are based on imaging the cells or cell clusters inside the cavities of the microplates.

A variety of different types of microplates exist for these specialised applications. Often these microplates comply with an industry standard published by ANSI-SLAS, that aims at ensuring interoperability with laboratory equipment such as robotics and centrifuges.

Furthermore, the document U.S. Pat. No. 9,790,465 B2 discloses a well article with at least one chamber for culturing spheroidal cell masses. The document WO 2019/014541 A2 discloses a device for culturing and imaging cells and 3D cell cultures. The device comprises a plurality of wells with each well having a non-circular cross section and having at least one vertex.

However, it is often difficult to combine the requirements of different applications, such that all steps of culturing and analysing samples can be carried out in the same microplate. The requirements often differ in optical, fluid mechanics and/or mass transfer characteristics and the impact of these requirements on the geometry of the microplates, in particular, the cavities of the microplates. Therefore, it is often necessary to use different, individually optimised microplates for culturing and for subsequent assays or analyses. This necessitates the pipetting of samples from one microplate to another, a step that is not only labour-, time- and cost-intensive, but also risks losing or damaging samples as well as introducing pipetting errors. Further, the pipetting step risks contaminating the sample and it is a potential safety hazard for the technician carrying out experiments. Ultimately, moving samples from one microplate to another via pipetting reduces experimental throughput.

SUMMARY

In an embodiment, the present disclosure provides a microplate assembly for a plurality of samples comprises a donor microplate including a plurality of sample donor cavities. The microplate assembly further comprises a receiver microplate including a plurality of sample receiver cavities each sample receiver cavity having a transparent receiver bottom. In addition, the microplate assembly comprises a leak-tight connecting structure configured to assemble the donor microplate and the receiver microplate, with at least one of the sample donor cavities being in communication with at least one of the sample receiver cavities.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 10 is a detailed schematic sectional view of the leak-tight connecting structure according to FIG. 5 further comprising a clamping device;

FIG. 11 is a detailed schematic sectional view of the leak-tight connecting structure according to FIG. 5 further comprising an embodiment of a clamping device;

FIG. 12 is a detailed schematic sectional view of the leak-tight connecting structure according to FIG. 6 further comprising the clamping device according to FIG. 11;

FIG. 13 is a detailed schematic sectional view of the leak-tight connecting structure according to FIG. 2 further comprising an embodiment of a clamping device;

FIG. 14 is a detailed schematic sectional view of the leak-tight connecting structure according to FIG. 2 further comprising an embodiment of a clamping device;

FIG. 15 is a detailed schematic sectional view of the leak-tight connecting structure according to FIG. 2 further comprising the clamping devices according to FIGS. 11 and 13;

DETAILED DESCRIPTION

Figure 1:
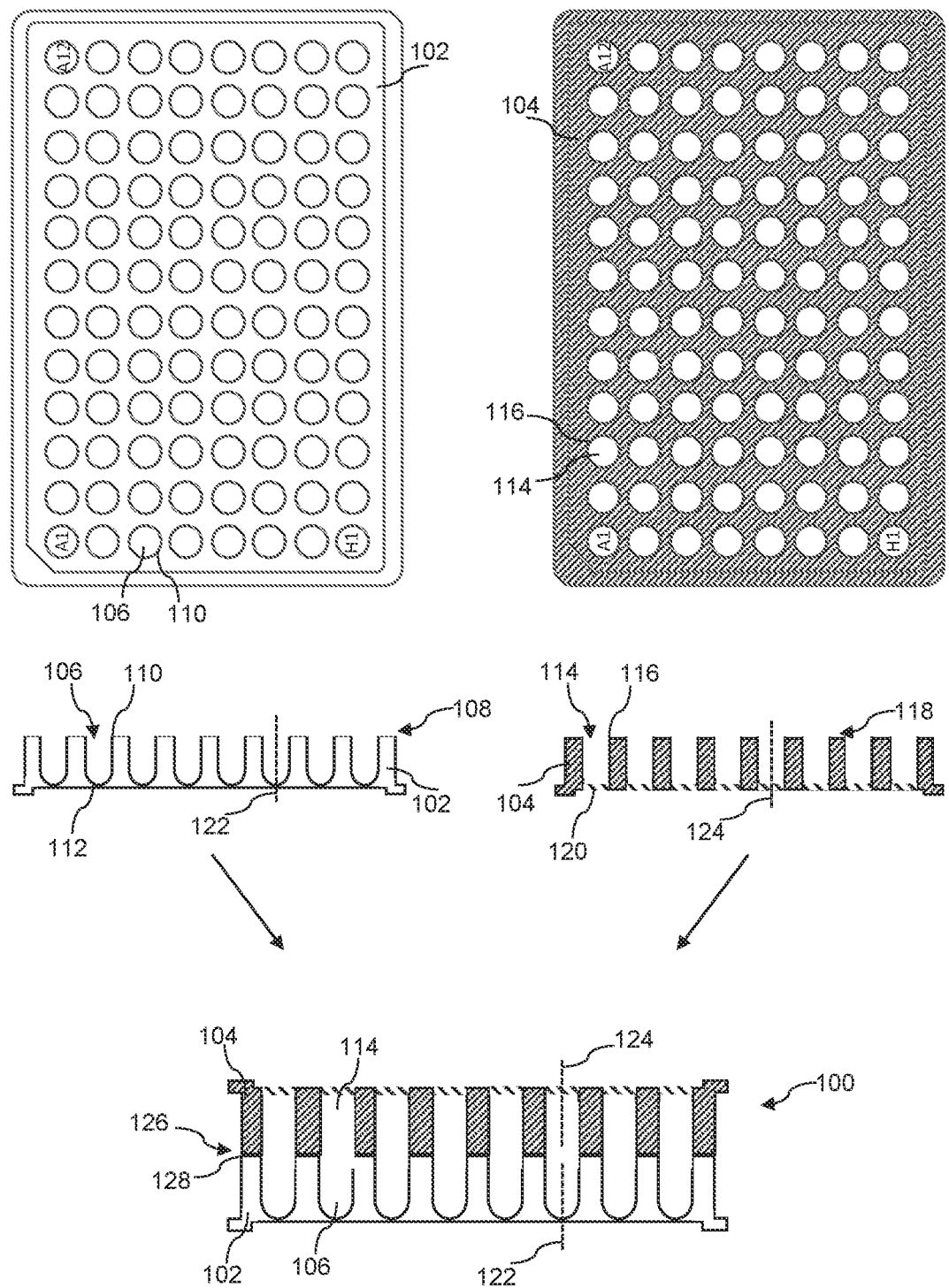
FIG. 1 is a schematic diagram of a microplate assembly and a top view and a sectional view of each, a donor microplate and a receiver microplate.

In an embodiment, the present disclosure provides a microplate assembly and a method for transferring samples that enable an easy and safe transfer of samples between microplates.

A microplate assembly for a plurality of samples comprises a donor microplate including a plurality of sample donor cavities. The microplate assembly further comprises a receiver microplate including a plurality of sample receiver cavities each sample receiver cavity having a transparent receiver bottom. In addition, the microplate assembly comprises a leak-tight connecting structure configured to assemble the donor microplate and the receiver microplate, with at least one of the sample donor cavities being in communication with at least one of the sample receiver cavities.

The sample donor cavities and samples receiver cavities are also known as sample wells of a microplate. The cavities, or the wells, can each hold samples. The donor and the receiver microplate are also known as microwell plates or microtiter plates. Generally, the optimal geometries of sample donor and receiver cavities differ with their respective uses. For example, the donor microplate has a geometry particularly suited to cell culturing, and is often concave. This concave surface introduces optical aberrations when imaging the contents of the donor cavity with an inverse microscope. Similarly, liquid inside the donor cavity forms a concave meniscus, which introduces optical aberrations when imaging the contents of the donor cavity from above. On the other hand, the receiver microplate features receiver cavities with a flat transparent bottom, which allows imaging the contents of the cavity without optical aberrations. By means of the assembly samples are transferrable between the microplates without individually pipetting the samples in order to image samples in the receiver microplate that were cultured in the donor microplate. This greatly reduces time requirements for the transfer and avoids damaging the samples during pipetting. Thus, the assembly enables the safe connection of two microplates in order to easily transfer samples between the cavities of the two microplates without leakage or cross-contamination of the samples.

In some embodiments, the sample donor cavities and the sample receiver cavities are aligned in pairs to each other in an assembled state. This enables that the donor cavities and the receiver cavities can be easily connected to each other and that samples can be safely transferred between each pair of cavities.

In particular, a longitudinal axis of at least one sample receiver cavity is aligned with a longitudinal axis of at least one communicating sample donor cavity. This makes it particularly easy to retrace a sample's position when it is transferred between the donor and the receiver microplates.

In an embodiment, a longitudinal axis of at least one sample receiver cavity is laterally shifted relative to a longitudinal axis of at least one communicating sample donor cavity. This allows easily changing the spatial arrangement of samples to each other, when they are transferred between the donor microplate and the receiver microplate.

In an embodiment, at least two of the sample receiver cavities are interconnected, meaning they are in communication, through a connection element to allow fluid exchange between the two of the sample receiver cavities. This makes it particularly easy to further analyse the samples in those two of the sample receiver cavities.

In particular, the connection element is a microfluidic chip integrated into the receiver microplate. This enables particularly complex interconnections between receiver cavities.

In some embodiments, the leak-tight connecting structure comprises a seal arranged around receiver openings of the sample receiver cavities. This enables a robust and easy to manufacture leak-tight connection between the donor and receiver cavities.

In an embodiment, the leak-tight connecting structure comprises protrusions and corresponding recesses said protrusions being located around one of donor and receiver openings and said recesses being located around the other of the donor and receiver openings of the sample donor or receiver cavities. This enables a particularly robust and leak-tight connection between the donor and receiver cavities.

In particular, each protrusion and/or each recess comprises a circumferential seal. This makes the interconnection between the protrusion and the recess particularly leak-tight.

In an embodiment, the leak-tight connecting structure comprises an adapter configured to be sandwiched between the donor microplate and the receiver microplate, said adapter comprising adapter channels configured to bring at least one of the sample donor cavities in communication with at least one of the sample receiver cavities. This enables a particularly robust leak-tight connection between the microplates and the donor and receiver cavities.

In particular, the adapter channels are configured to bring in communication at least some of those sample donor cavities and sample receiver cavities whose respective longitudinal axes are aligned. This makes it particularly easy to retrace a sample's position when it is transferred between the donor and the receiver microplates.

In particular, the adapter channels are configured to bring in communication at least some of those sample donor cavities and sample receiver cavities whose respective longitudinal axes are laterally shifted to each other. This allows easily changing the spatial arrangement of samples to each other, when they are transferred between the donor microplate and the receiver microplate.

In some embodiments, the adapter is configured to block communication between some of the sample donor cavities and some of the sample receiver cavities. This allows easily transferring only some of the samples between the microplates.

In a further embodiment, the leak-tight connecting structure comprises a clamping device configured to press the donor microplate and the receiver microplate against each other. This provides a particularly robust connection between the sample donor cavities and the sample receiver cavities.

In some embodiments, the clamping device comprises reversibly interlocking elements configured to interlock for pressing the donor microplate and the receiver microplate against each other. This enables a particularly easy assembly of the clamping device with the donor and the receiver microplates.

In some embodiments, the clamping device comprises threaded fasteners configured to press the donor microplate and the receiver microplate against each other. This results in a particularly robust clamping device.

In particular, the clamping device comprises at least two magnets configured to apply a magnetic force for pressing the donor microplate and the receiver microplate against each other. This enables the donor microplate and the receiver microplate being pressed together with a particularly even contact pressure.

In particular, the sample donor cavities each comprise a donor bottom comprising a rounded inner surface or a V-shape. This enables optimal cell culturing conditions in the sample donor cavities.

In an embodiment, the receiver bottom is formed from a transparent plano-parallel plate. This enables aberration free imaging of the receiver cavities contents through the receiver bottom.

In particular, the sample cavities have a rectangular or a round cross section. This enables a particularly flexible use of the donor and receiver microplates.

In particular, an inner surface of each sample donor cavity comprises a low-attachment coating. This allows particularly easy three-dimensional cell culturing of spheroids inside the sample donor cavities.

In some embodiments, at least some of the samples are transferable at least from the donor microplate to the receiver microplate by means of centrifugation. This enables a particularly easy and complete transfer of samples. Alternatively, the samples can be transferred from the donor microplate to the receiver microplate by gravity by turning the assembly.

In an embodiment, a receiver microplate for a microplate assembly is provided, including: a plurality of sample receiver cavities, each sample receiver cavity having a transparent receiver bottom; a leak-tight connecting structure element configured to connect the receiver microplate with a donor microplate of the microplate assembly such that at least one of the sample receiver cavities is in communication with at least one of a plurality of sample donor cavities of the donor microplate.

In an embodiment, a leak-tight connecting structure for a microplate assembly is provided, comprising: an adapter configured to be sandwiched between a donor microplate and a receiver microplate said adapter comprising adapter channels configured to bring sample donor cavities of the donor microplate in communication with sample receiver cavities of the receiver microplate.

In an embodiment, a method for transferring samples by means of a microplate assembly is provided, the microplate assembly comprising: a donor microplate including a plurality of sample donor cavities; a receiver microplate including a plurality of sample receiver cavities, each sample receiver cavity having a transparent receiver bottom; a leak-tight connecting structure configured to assemble the donor microplate and the receiver microplate with at least one of the sample donor cavities being in communication with at least one of the sample receiver cavities. The method comprising the following steps: culturing samples in the sample donor cavities of the donor microplate; assembling the microplates and the leak-tight structure such that at least one of the sample donor cavities is in communication with at least one of the sample receiver cavities; transferring the samples from the sample donor cavities to the sample receiver cavities.

FIG. 1 shows a schematic diagram of a sectional view of a microplate assembly 100 and a top view and a sectional view of each, a donor microplate 102 and a receiver microplate 104. In the top view the donor microplate 102 is shown comprising 96 sample donor cavities 106 that are arranged in an eight by twelve grid. To identify individual cavities 106, a coordinate system can be used whereby rows are identified by letters and columns are identified by numbers. The top left cavity 106 of the donor microplate 102 is identified in FIG. 1 as A1. Accordingly, the sample donor cavity exemplarily identified by the reference sign 106 is at the position C1. Each cavity 106 is open to a top side 108 of the donor microplate 102 and comprises a donor opening 110. This donor opening 110 opens the cavity 106 on the top side 108 and allows access to the inside of the donor cavity 106. The donor opening 110 of the donor microplate 102 in FIG. 1 is circular. Similarly, the inner surface of the donor cavity 106 is circular in planes parallel to the top side 108. A donor bottom 112 of the sample donor cavity 106 has a rounded inner surface, particularly a concave or a hemispherical surface, and is frequently termed a round bottom. The donor bottom 112 shape of the donor microplate 102 is formed for cell culturing to produce cell clusters such as spheroids, microtissues, tumoroids, or organoids, in particular, for three-dimensional cell culturing in suspension without scaffolds. The cell clusters that are produced generally have a diameter in the range of 10 μm to 5000 μm. Spheroids and tumoroids, in particular, can have a diameter in the range of 100 μm to 500 μm. Organoids, in particular, can have a diameter in the range of 800 μto 2000 μm.

Similarly, the receiver microplate 104 comprises 96 sample receiver cavities 114. The specific sample receiver cavity 114, exemplarily identified by reference sign 114, is at the position A3 on an eight by twelve grid, as explained above for the donor microplate 102. Further, each sample receiver cavity 114 comprises a receiver opening 116. The receiver opening 116 opens the cavity 114 towards a top side 118 of the receiver microplate 104. As described for the donor microplate 102 for the donor cavity 106, the receiver cavity 114 and its receiver opening 116 is circular. A receiver bottom 120 of the sample receiver cavity 114 is flat such that the cavity 114 has a rectangular outline in the sectional view.

Further, the receiver bottom 120 is transparent, particularly, an optically clear plane-parallel plate. For example, the receiver bottom 120 can be manufactured from glass or optical-grade polystyrene, cyclic olefin copolymers or polycarbonate. Thus, the inside of the cavity 114 can be viewed through the receiver bottom 120, for example with a microscope, in particular with an inverted microscope. This allows observing of, for example, a sample in the cavity 114 with a minimal amount of optical aberrations. In addition, when imaging the sample through the receiver bottom 120, the distance between the sample and the microscope objective is reduced compared to imaging the sample through the opening 116 of the microplate 104. This is particularly advantageous when using high numerical aperture objectives that require short working distances between front lens of the objective and the imaged sample. As a consequence of this requirement, imaging of samples with a high numerical aperture objective inside the cavity 114 is usually only possible through the receiver bottom 120.

Alternatively, the donor cavities 106 and/or the receiver cavities 114 can have different geometries to the geometries described above. For example, the cavity 106, 114 geometry can be rectangular in planes parallel to the top sides 108, 118. In addition, the donor bottom 112 can be V-shaped or flat. Moreover, the number of cavities 106, 114 of the microplates 102, 104 can be larger or smaller than 96, with the number of donor cavities 106 not having to match the number of receiver cavities 114 of the microplates 102, 104 of the assembly 100. For example, the microplates 102, 104 can comprise 1, 6, 8, 24, 48, 96, 384 or 1536 cavities 106, 114.

The microplate assembly 100 comprises the donor microplate 102 and receiver microplate 104. In FIG. 1 the microplate assembly 100 is shown in an assembled state, in which the donor microplate 102 is joined with the receiver microplate 104 at their respective top sides 108, 118. When in the assembled state, the donor openings 110 and the receiver openings 116 are aligned pairwise. Consequently, the donor cavities 106 and the receiver cavities 114 are aligned pairwise, as well. In particular, a central longitudinal axis 122 of each of the donor cavities 106 is aligned with a central longitudinal axis 124 of the respective paired receiver cavity 114. This means, the longitudinal axis 122, 124 of one of the donor cavities 106 and of one of the receiver cavities 114, that are aligned in a pair to each other in the assembled state, are arranged in a line. Further, the diameter and/or shape of the paired cavities 106, 114, in particular the paired openings 110, 116, are the same or at least similar.

In order to ensure a connection between the microplates 102, 104 when they are in the assembled state, a leak-tight connecting structure 126 is configured to assemble the donor and the receiver microplates 102, 104. In particular, the donor and receiver microplates 102, 104 are assembled, such that the donor cavities 106 and the receiver cavities 114 are in communication and samples can be exchanged between the donor cavities 106 and receiver cavities 114 without leakage. In particular, the donor openings 110 and the receiver openings 116 are in communication. The samples can comprise liquids and/or solids. For example, the leak-tight connecting structure 126 can be a seal, in particular a flat flexible polymer gasket 128 between the top side 108, 118 of the microplates 102, 104. For example, the top side 118 of the receiver microplate 104 can be coated with a film of polytetrafluoroethylene, that creates a leak-tight seal between the microplates 102, 104 when the assembly 100 is in the assembled state. In particular, the leak-tight connecting structure 126 is arranged around either or both of the donor openings 110 and receiver openings 116.

FIGS. 2 to 9 show detailed schematic sectional views of embodiments of leak-tight connecting structures of the microplate assembly 100. Elements with the same structure or function have the same reference signs. Each of the FIGS. 2 to 9 shows a segment of the assembly 100 with a single pair of one of the donor cavities 106 and one of the receiver cavities 114 and an interface between the openings 110, 116 of the two cavities 106, 114 at which leak-tight connecting structures are arranged.

Figure 2:
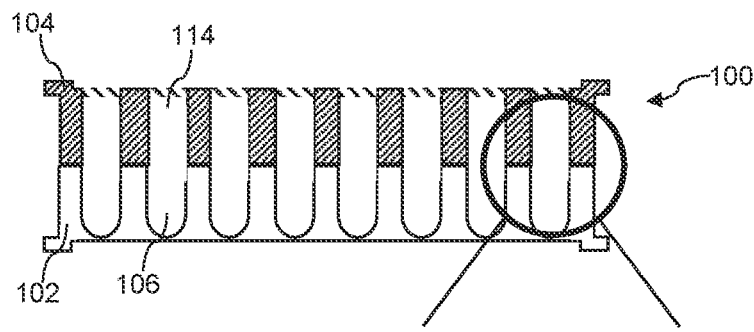
FIG. 2 is a detailed schematic sectional view of an embodiment of a leak-tight connecting structure of the microplate assembly.
Figure 2:
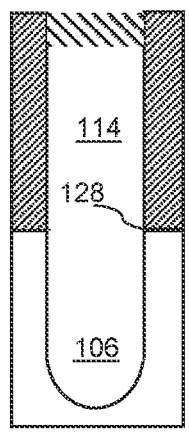

FIG. 2 shows the leak-tight connecting structure 126. The leak-tight connecting structure 126 comprises the gasket 126 at the interface of the openings 110, 116 of the two cavities 106, 114.

Figure 3:
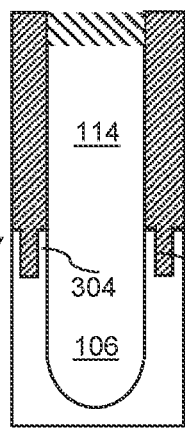
FIG. 3 is a detailed schematic sectional view of an embodiment of a leak-tight connecting structure of the microplate assembly.
Figure 4:
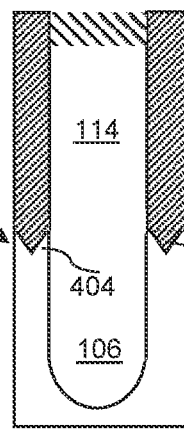
FIG. 4 is a detailed schematic sectional view of an embodiment of a leak-tight connecting structure of the microplate assembly.
Figure 5:
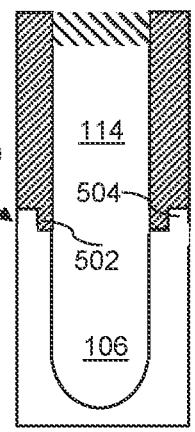
FIG. 5 is a detailed schematic sectional view of an embodiment of a leak-tight connecting structure of the microplate assembly.

FIGS. 3 to 5 show leak-tight connecting structures 300, 400, 500. The leak-tight connecting structures 300 to 500 each comprise protrusions 302, 402, 502 and corresponding recesses 304, 404, 504 arranged around the receiver openings 110 and donor openings 116, respectively, that interlock to form a leak-tight connection.

Additionally, the leak-tight connecting structures 300 to 500 can comprises surfaces coated with a flexible polymer similar to the leak-tight connecting structure 126, improving the leak-tight seal between aligned pairs of cavities 106, 114. Further, the protrusions 302, 402, 502 and corresponding recesses 304, 404, 504 can have different geometries to the ones shown in FIGS. 3 to 5.

Figure 6:
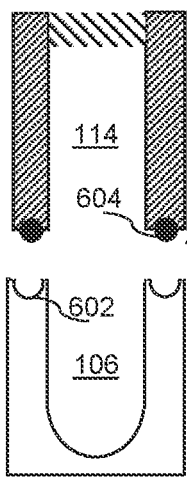
FIG. 6 is a detailed schematic sectional view of an embodiment of a leak-tight connecting structure of the microplate assembly.
Figure 7:
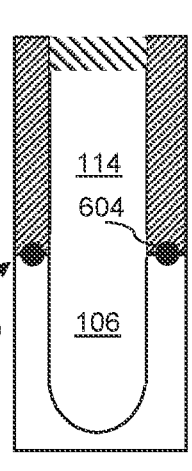
FIG. 7 is a detailed schematic sectional view of an embodiment of the leak-tight connecting structure according to FIG. 6 in an assembled state.

FIG. 6 shows a leak-tight connecting structure 600 that comprises a recess 602 around the opening 110 of the donor cavity 106 and a corresponding protrusion around the opening 116 of the receiver cavity 114 wherein the protrusion is formed by a circumferential seal, in particular an O-ring 604. FIG. 7 shows the leak-tight connecting structure 600 in the assembled state, where the O-ring 604 interlocks with the recess 602 to form a leak-tight connection to allow leakage-free transfer of a sample between the cavities 106, 114.

Figure 8:
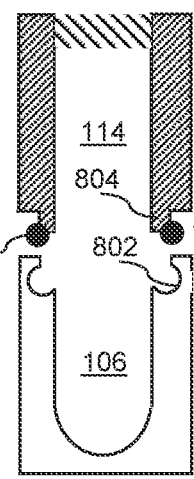
FIG. 8 is a detailed schematic sectional view of an embodiment of a leak-tight connecting structure of the microplate assembly.
Figure 9:
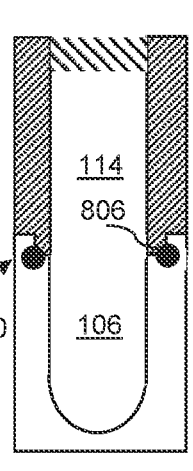
FIG. 9 is a detailed schematic sectional view of an embodiment of the leak-tight connecting structure according to FIG. 8 in an assembled state.

FIG. 8 shows a leak-tight connecting structure 800 that comprises a recess 802 around the opening 110 of the donor cavity 106 and a corresponding protrusion 804 around the opening 116 of the receiver cavity 114 wherein the protrusion 804 comprises a circumferential seal, in particular an O-ring 806. FIG. 9 shows the leak-tight connecting structure 800 in the assembled state, where the O-ring 806 and the protrusion 804 interlock with the recess 802 to allow leakage-free transfer of a sample between the cavities 106, 114.

FIGS. 10 to 15 show detailed schematic sectional views of further alternative embodiments of leak-tight connecting structures comprising clamping devices configured to press the donor microplate 102 and the receiver microplate 104 against each other. Each of the FIGS. 10 to 15 shows a segment of the assembly 100 with a single assembled pair of one of the donor cavities 106 and one of the receiver cavities 114 and an interface between the openings 110, 116 of the two cavities 106, 114 and leak-tight connecting structures comprising clamping devices.

FIG. 10 shows the leak-tight connecting structure 500 according to FIG. 5 further comprising a clamping device 1000. The clamping device 1000 is formed as a U-shaped bracket that is moved over the donor microplate 102 and the receiver microplate 104 in their assembled state, such that the microplates 102, 104 are arranged between the flanks 1002, 1004 of the U-shaped bracket. When the microplates 102, 104 are between the flanks 1002, 1004, the clamping device 1000 exerts pressure on a bottom side of the donor microplate 102 and a bottom side of the receiver microplate 104, thereby pressing together the top sides 108, 118 of the microplates 102, 104. The bottom sides of the microplates 102, 104 being opposite and in parallel to the respective top side 108, 118 of the microplates 102, 104. This ensures the leak-tight connection between the microplates 102, 104.

Additionally, or alternatively, the clamping device 1000 may comprise interlocking elements, configured to interlock in a position, in which the flanks 1002, 1004 exert pressure on the bottom sides of the microplates 102, 104. In particular, the interlocking elements are reversibly interlocking, such that the interlocking elements of the clamping device 1000 can be assembled by interlocking to press the microplates 102, 104 against each other and disassembled to release the microplates 102, 104.

FIG. 11 shows the leak-tight connecting structure 500 according to FIG. 5 further comprising a clamping device 1100. The clamping device 1100 comprises a first magnetic element 1102 arranged on the bottom side of the donor microplate 102 and a second magnetic element 1104 arranged on the bottom side of the receiver microplate 104. When the magnetic elements 1102, 1104 are placed as shown in FIG. 11 with the microplates between the magnetic elements 1102, 1104, the polarities of the magnetic elements 1102, 1104 attract the magnetic elements 1102, 1104 to each other. The magnetic force between the magnetic elements 1102, 1104 therefore presses the microplates 102, 104 against each other. This ensures the leak-tight connection between the microplates 102, 104.

FIG. 12 shows the leak-tight connecting structure 600 according to FIG. 6 further comprising the clamping device 1100. As explained for FIG. 11, the magnetic force between the magnetic elements 1102, 1104 presses the microplates 102, 104 against each other. This ensures the leak-tight connection between the microplates 102, 104.

FIG. 13 shows the leak-tight connecting structure 126 according to FIG. 2 further comprising a clamping device 1300. The clamping device 1300 comprises threaded fasteners 1302, 1304, which are reversibly secured to a first clamping element 1306 and a second clamping element 1308. The first clamping element 1306 and the second clamping element 1308 can be forced towards each other by means of the threaded fasteners 1302, 1304. With the microplates 102, 104 between the clamping elements 1306, 1308, the clamping device 1300 presses the microplates against each other and ensures a leak-tight connection between the microplates 102, 104.

FIG. 14 shows the leak-tight connecting structure 126 according to FIG. 2 further comprising a clamping device 1400. The clamping device 1400 comprises threaded fasteners 1402, 1404, which are reversibly secured by fastening means 1406, 1408, for example, nuts. Tightening of the threaded fasteners 1402, 1404 and fastening means 1406, 1408 forces a first clamping element 1410 towards a second clamping element 1412. This results in the microplates 102, 104 being pressed against each other, ensuring a leak-tight connection between the microplates 102, 104.

Generally, the embodiments of the leak-tight connecting structure according to FIGS. 2 to 9 may comprise one or more of the embodiments of the clamping device according to FIGS. 10 to 14. For example, FIG. 15 shows the leak-tight connecting structure 126 according to FIG. 2 further comprising the clamping device 1100 according to FIG. 11 and the clamping device 1300 according to FIG. 13. The combination of these clamping devices 1100, 1300 ensures the leak-tight connection between microplates 102, 104.

Besides their use in ensuring the leak-tight connection, one or both of the magnetic elements 1102, 1104 can additionally or alternatively be used in combination with magnetic beads or magnetic particles, for example. In particular, this allows three-dimensional cell culturing by magnetic levitation and/or immunomagnetically separating samples within the microplate assembly 100.

Figure 16:
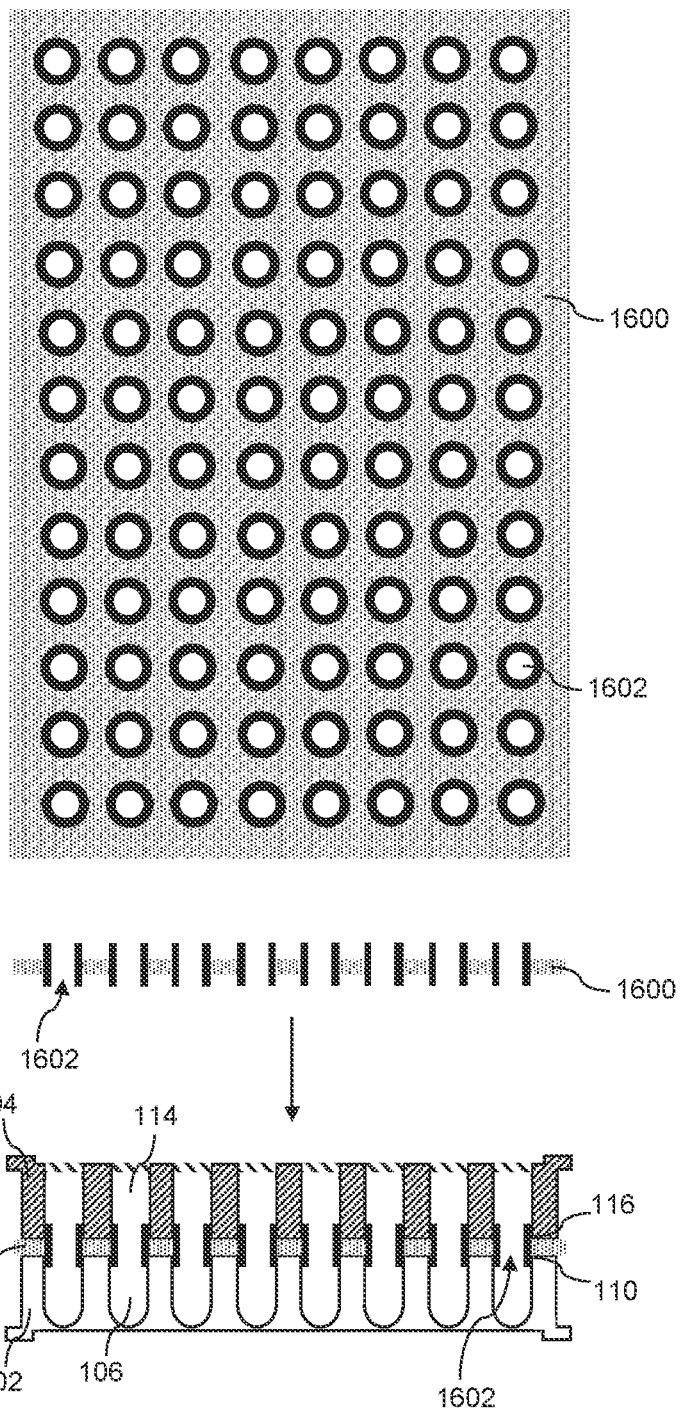
FIG. 16 is a schematic top view and sectional view of an adapter and a sectional view of a leak-tight connecting structure comprising the adapter in an assembled state.

FIG. 16 shows a schematic top view, a sectional view of an adapter 1600 and a sectional view in an assembled state of a leak-tight connecting structure comprising the adapter 1600. In the assembled state, the adapter 1600 is sandwiched between the donor microplate 102 and the receiver microplate 104. The adapter 1600 comprises channels 1602 that in the assembled state bring into communication the donor cavities 106 with the respective receiver cavities 114 that are in pairwise alignment. In particular, the adapter 1600 brings into communication the donor openings 110 with the respective receiver openings 116. The adapter 1600 forms a leak-tight connection between each of these aligned pairs of donor and receiver cavities 106, 114. Thus, liquid and/or solid samples can be transferred between the cavities 106, 114 without leakage of the samples.

In the assembled state, the adapter 1600 connects all 96 cavities 106 of the donor microplate 102 to the respective one of the 96 cavities 114 of the receiver microplate 104 by means of one of 96 channels 1602. To allow easy assembly of the adapter 1600 with the microplates 102, 104, the adapter 1600 is manufactured from an elastic polymer, in particular silicone rubber.

In some embodiments, the channels 1602 of the adapter 1600 can be formed such that the channels 1602 bring into communication donor cavities 106 and receiver cavities 114 that are not aligned in pairs. This means the longitudinal axes 124, 122 of these cavities 106, 114 are laterally shifted relative to each other.

Figure 17:
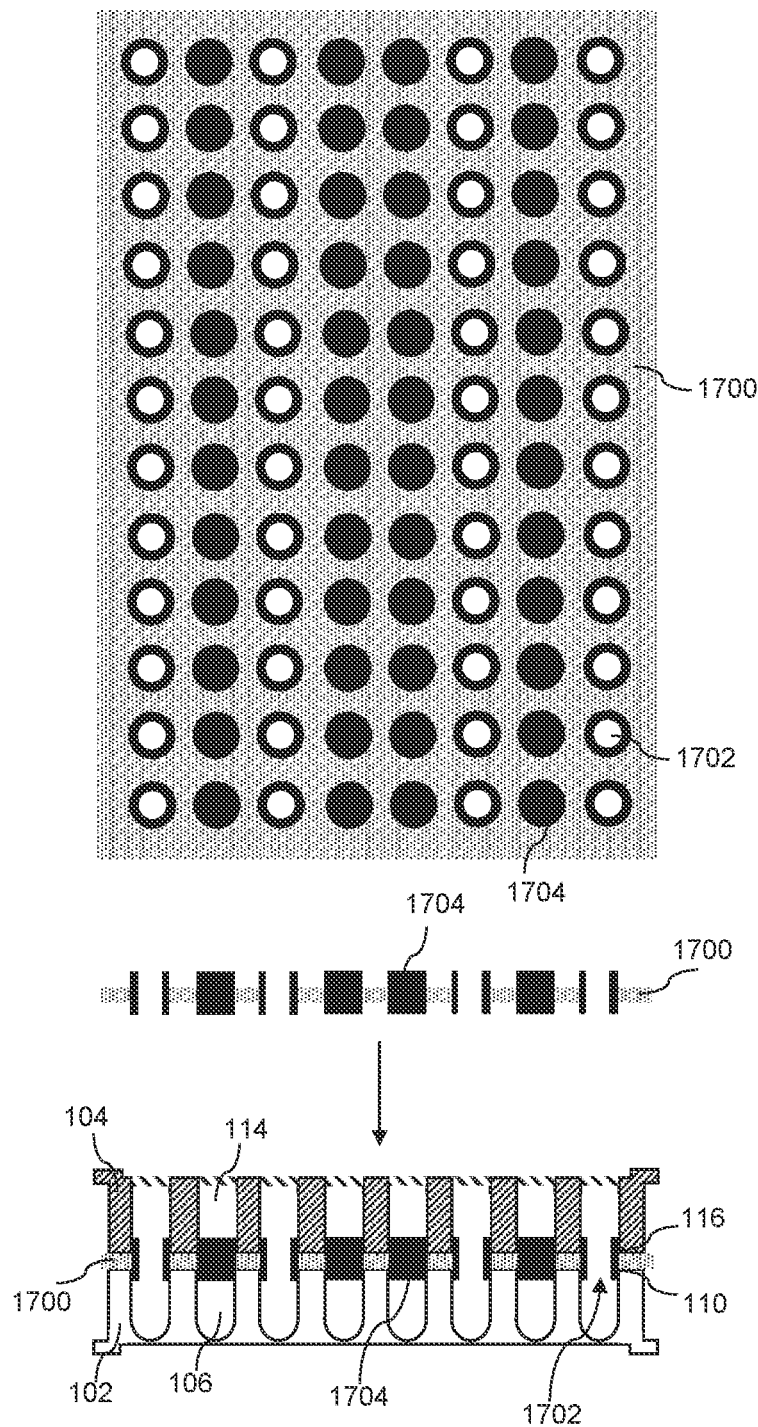
FIG. 17 is a schematic top view and sectional view of an embodiment of an adapter and a sectional view of a leak-tight connecting structure comprising the adapter in an assembled state.

FIG. 17 shows a schematic top view, a sectional view of an adapter 1700 and a sectional view in an assembled state of a leak-tight connecting structure comprising the adapter 1700. In the assembled state, the adapter 1700 is sandwiched between the donor microplate 102 and the receiver microplate 104. Similar as described for the adapter 1600, the adapter 1700 comprises channels 1702 that in the assembled state bring into communication the donor cavities 106 with the respective receiver cavities 114 that are in pairwise alignment. In particular, the adapter 1700 brings into communication the donor openings 110 with the respective receiver openings 116. The adapter 1700 forms a leak-tight connection between each of these aligned pairs of donor and receiver cavities 106, 114, thus ensuring the leakage free transfer of samples between the donor and receiver cavities 106, 114.

Further, the adapter 1700 comprises plugs 1704, that block the communication between some of the donor and receiver cavities 106, 114. Thus, some of the donor and receiver cavities 106, 114 that are aligned in pairs are not in communication with each other, instead they are blocked by one of the plugs 1704. Specifically, in the assembled state, the adapter 1700 connects 48 cavities 106 of the donor microplate 102 to a respective one of 48 cavities 114 of the receiver microplate 104 by means of one of 48 channels 1702. In addition, the remaining 48 donor cavities 106 and 48 receiver cavities 114, that are aligned in pairs, are blocked from communicating with each other by 48 plugs 1704. Similarly to adapter 1600, the adapter 1700 is manufactured from an elastic polymer.

Alternatively, or additionally, an adapter can comprise channels that bring into communication those donor and receiver cavities 106, 114 that are not aligned in pairs. This means the longitudinal axes 124, 122 of these cavities 106, 114 are laterally shifted relative to each other.

Moreover, the adapters 1600, 1700 may alternatively or additionally comprise channels that bring into communication more than one of the donor cavities 106 with one of the receiver cavities 114 and/or comprise channels that bring into communication more than one of the receiver cavities 114 with one of the donor cavities 106. Further, the adapters 1600, 1700 may be formed to connect cavities 106, 114 of different sizes and/or shapes. For example, the adapters 1600, 1700 may be formed to connect cavities 106 with a square cross section to cavities 114 with a circular cross section.

Figure 18:
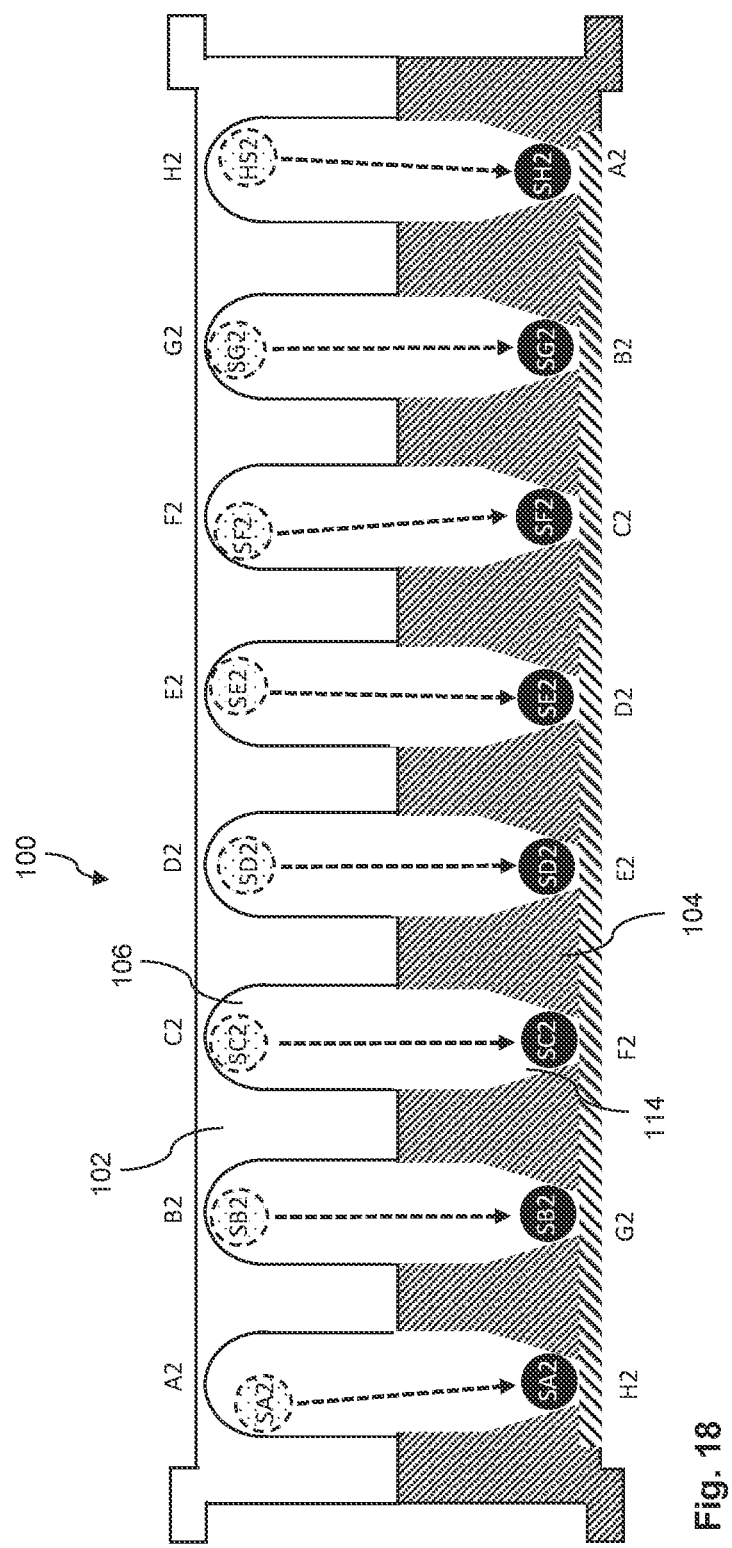
FIG. 18 is a schematic sectional view of the donor microplate and the receiver microplate according to FIG. 1.

FIG. 18 shows a sectional view of the donor microplate 102 and the receiver microplate 104 according to FIG. 1 in the assembled state. The sectional view shows the microplates 102, 104 cut along the second row of cavities 106, 114. Samples SA2 to SH2 can be transferred from the donor microplate 102 to the receiver microplate 104.

Figure 19:
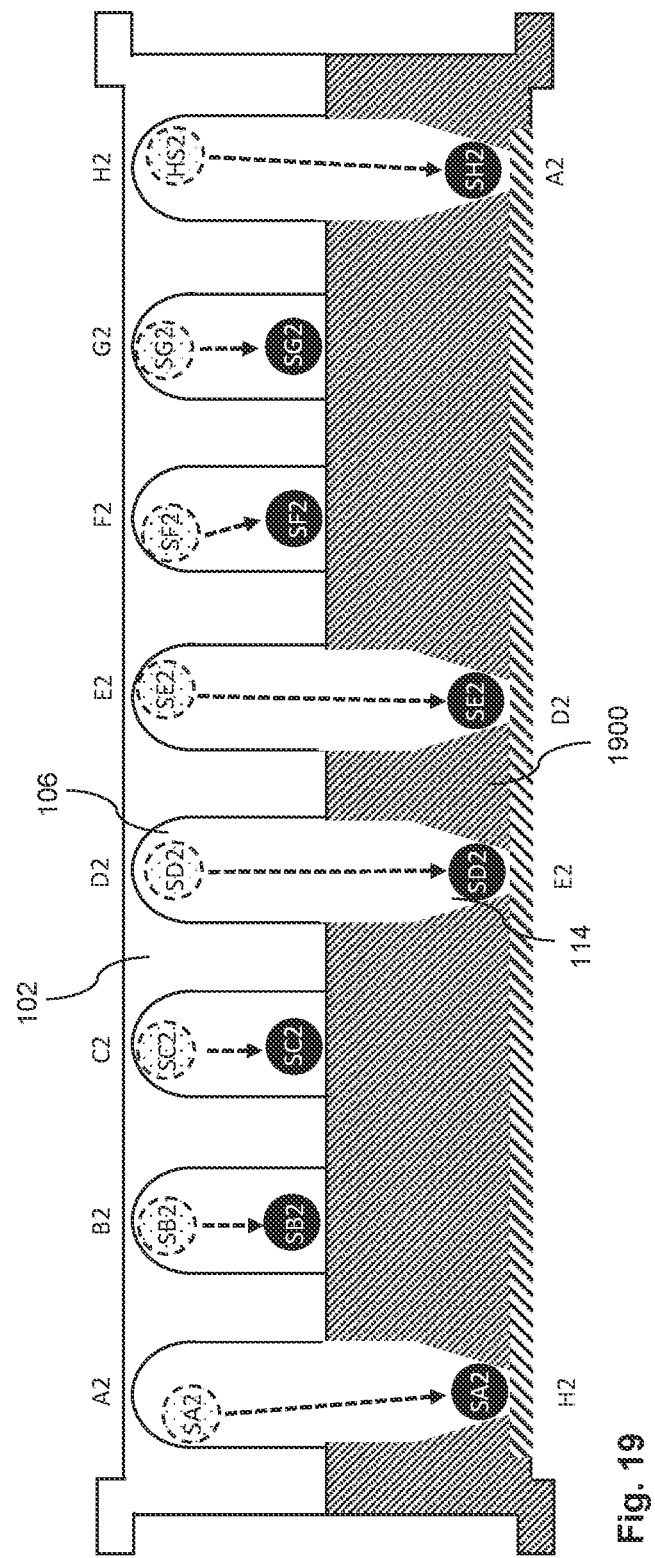
FIG. 19 is a schematic sectional view of the donor microplate and a receiver microplate according to an embodiment.

FIG. 19 shows a sectional view of the donor microplate 102 and a receiver microplate 1900 according to a further embodiment. The donor and receiver microplates 102, 1900 are shown in an assembled state. The microplates 102, 1900 each comprise a different number of cavities 106, 114. The receiver microplate 1900 has a lesser number of receiver cavities 114 than the donor microplate 102 has donor cavities 106. Each of the receiver cavities 114 is in pairwise alignment with one of the donor cavities 106. However, only those samples SA2 to SH2 can be transferred from the donor microplate 102 to the receiver microplate 1900, which are in one of the donor cavities 106 that are aligned with one of the receiver cavities 114, specifically, only samples SA2, SD2, SE2 and SH2 can be transferred to the receiver microplate 1900.

Figure 20:
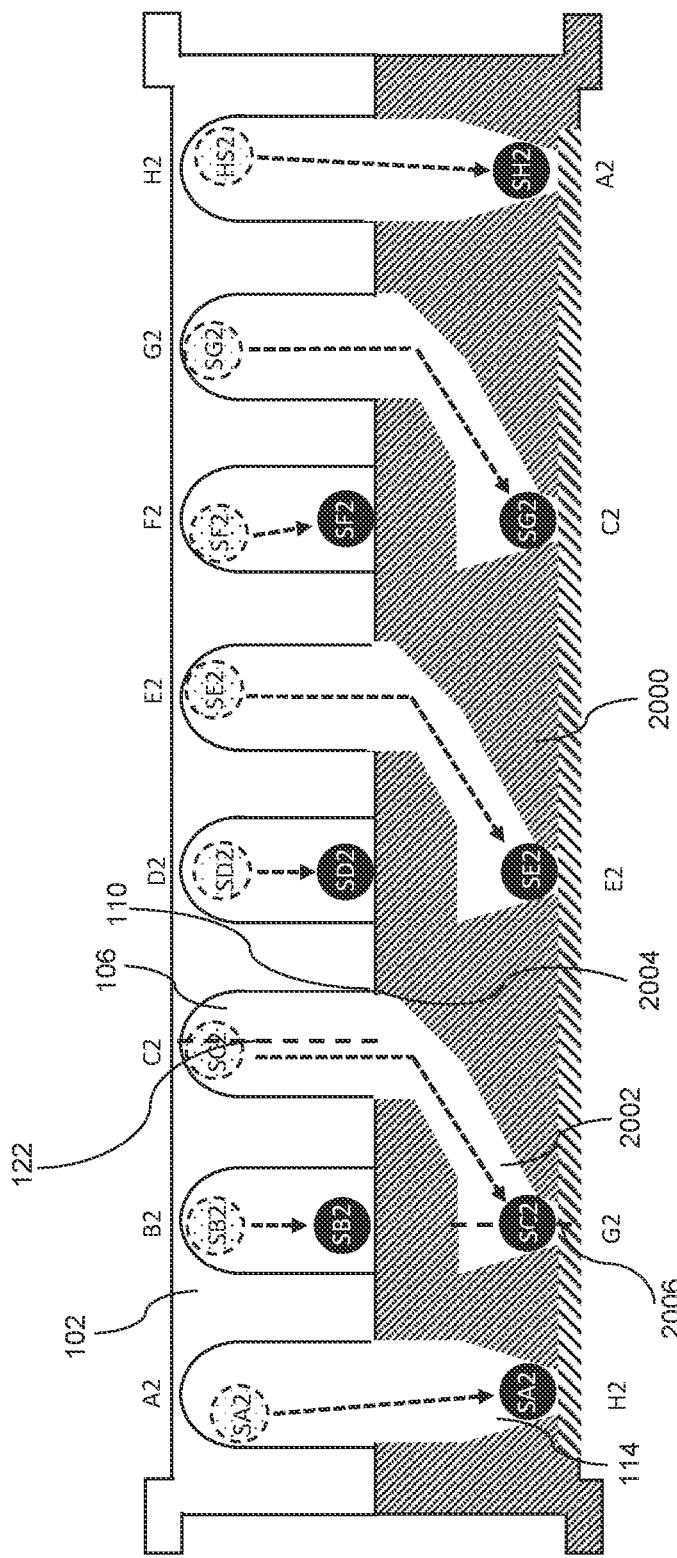
FIG. 20 is a schematic sectional view of the donor microplate and a receiver microplate according to an embodiment.

FIG. 20 shows a sectional view of the donor microplate 102 and a receiver microplate 2000 according to a further embodiment. The donor and receiver microplates 102, 2000 are shown in an assembled state. The receiver microplate 2000 comprises sample receiver cavities 114 as well as sample receiver cavities 2002. The sample receiver cavities 2002 are formed such that they are in communication with donor cavities 106 that are not aligned. In particular, the donor opening 110 of the donor cavity 106 is in communication with a receiver opening 2004 of the receiver cavity 2002. That means, a longitudinal axis 2006 of the receiver cavity 2002 is laterally shifted relative to the longitudinal axis 122 of the donor cavity 106, which the receiver cavity 2002 is in communication with. For example, this allows the transfer of sample SC2, from donor cavity at position C2 of the donor microplate 102 to receiver cavity at position G2 of the receiver microplate 2000.

Figure 21:
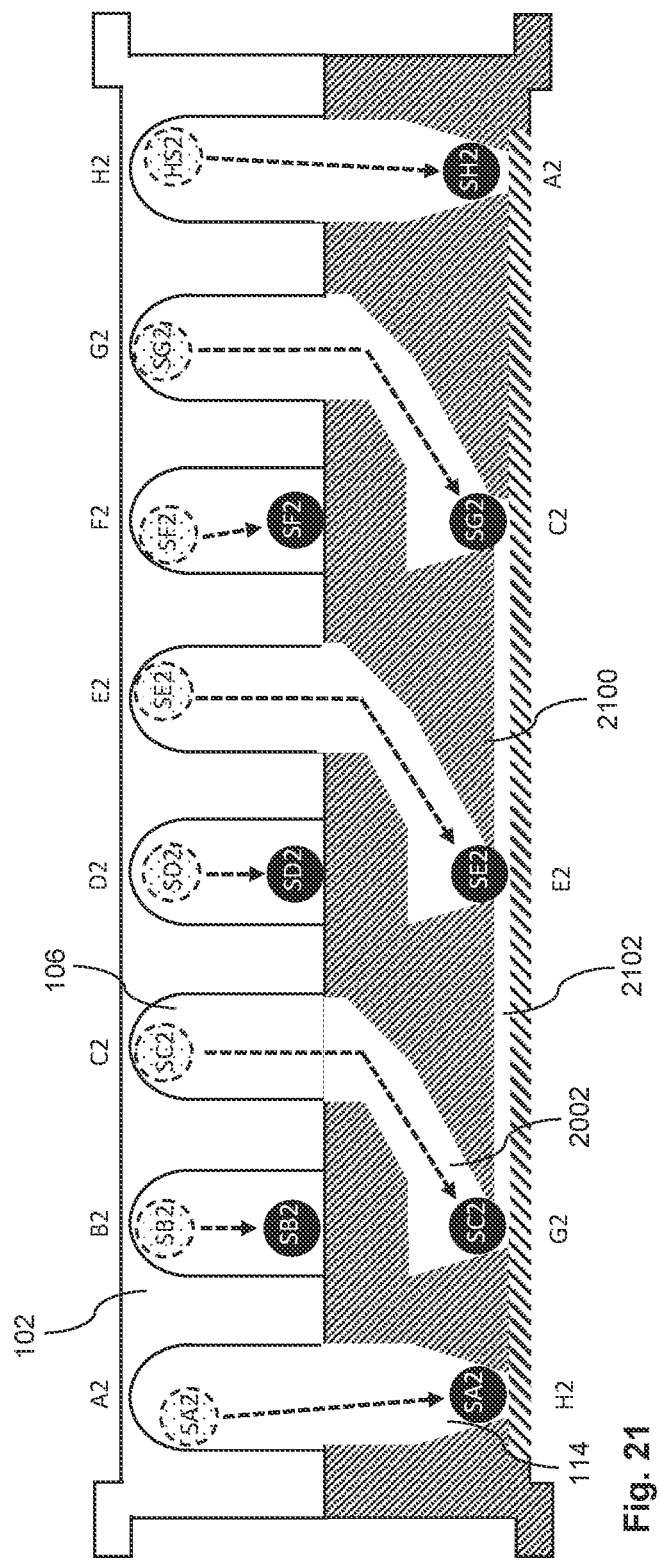
FIG. 21 is a schematic sectional view of the donor microplate and a receiver microplate according to an embodiment.

FIG. 21 shows a sectional view of the donor microplate 102 and a receiver microplate 2100 according to an embodiment. The donor and receiver microplates 102, 2100 are shown in an assembled state. The microplate 2100 comprises a connection element 2102, which brings into communication at least some of the cavities 2002 of the receiver microplate 2100. Specifically, the cavities 2002 at positions G2, E2 and C2 are in communication. Through the connection element 2102 the transfer of fluids and/or solids between those cavities 2002 is possible.

Alternatively, or additionally, the connection element 2102 can bring into communication some or all of the receiver cavities 114, 2102 of the receiver microplate 2100.

The connection element 2102 can be a microfluidic chip, for example. The microfluidic chip can comprise microchannels for the transfer of fluids and/or gases. In addition, the microfluidic chip can comprise micropumps, microvalves and/or microsensors. This allows controlling the communication between cavities 2002 of the microplate 2100. Specifically, by means of the connection element 2102, fluids can be passively or actively transferred from at least one of cavities 2002 to at least another of the cavities 2002. A sample in one of the receiver cavities 2002, can thereby be exposed to compounds stored in at least a further receiver cavity 2002, or the sample can be exposed to compounds produced by other samples in at least one of the other cavities 2002. These samples can, for example, comprise cells, in particular, mammalian cells or cells of a particular cell type or of different cell types. Thus, a sample in one of the cavities 2002 can be influenced or manipulated, for example, by changing chemical or environmental conditions. In addition, samples in different cavities 2002 can interact with each other and influence or manipulate each other, for example, by one sample in one of the cavities 2002 producing compounds that influence at least another sample in another one of the cavities 2002.

This allows mimicking cellular interactions of organs or organ systems in vitro. This is also known as organ-on-a-chip, human-on-a-chip or body-on-a-chip. Thus, the microplate assembly according to FIG. 21 allows high-throughput three-dimensional culturing of various cell types in the donor microplate 102 followed by fast transfer to the receiver microplate 2100 for analysis, in particular imaging, of specific cell types and their interactions.

Figure 22:
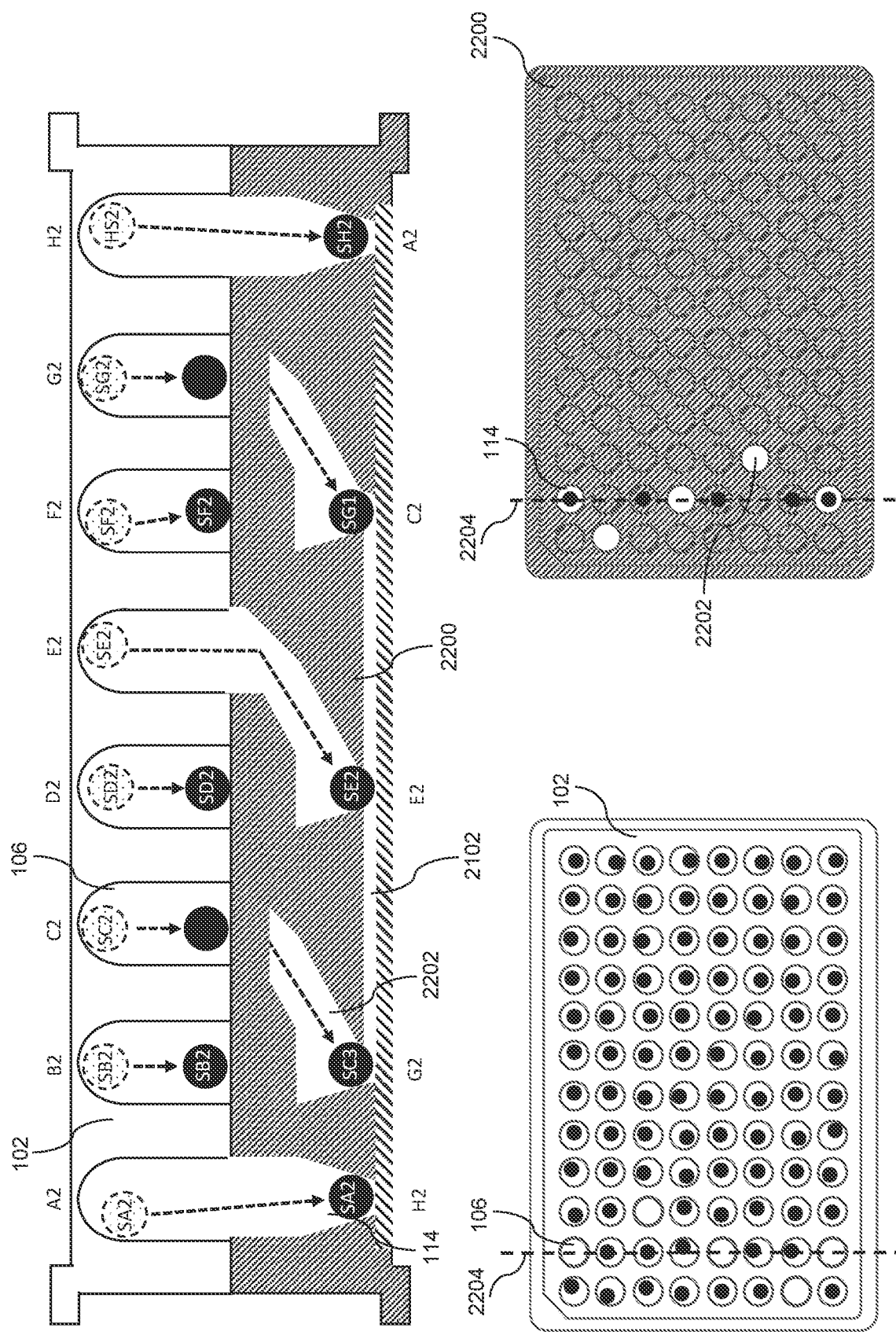
FIG. 22 is a schematic sectional view and a top view of the donor microplate and a receiver microplate according to an embodiment.

FIG. 22 shows a sectional view and a top view of the donor microplate 102 and a receiver microplate 2200 according to a further embodiment. The donor and receiver microplates 102, 2200 are shown in an assembled state. The receiver microplate 2200 comprises sample receiver cavities 114 as well as sample receiver cavities 2202. The sample receiver cavities 2202 are formed such that they are in communication with donor cavities 106 that are not aligned. The side view shows the donor and receiver microplates 102, 2200 cut along a line 2204 indicated in the top view. The receiver microplates 2200 is formed such that a sample from one of the donor cavities 106 can be transferred to one of the receiver cavities 2202, with the donor cavity 106 and the receiver cavity 2202 not in alignment. Thus, the donor cavity 106 and the receiver cavity 2202 can not only be in communication whilst misaligned in a direction along line 2204 (as shown in FIG. 21), but whilst misaligned in a direction at an angle to the line 2204 of the receiver microplate 2200. In addition, the receiver microplate 2200 comprises a connection element 2102.

Further, the example sample transfers from donor microplates 102 to receiver microplates 104, 1900, 2000, 2100, 2200 in FIGS. 18 to 22 allow the tracing of the samples from a particular one of the donor cavities 106 to a particular one of the receiver cavities 114, 2002, 2202. Thus, it is possible to unambiguously retrace and locate samples that were transferred from the donor microplate 102 to the receiver microplate 104, 1900, 2000, 2100, 2200.

Figure 23:
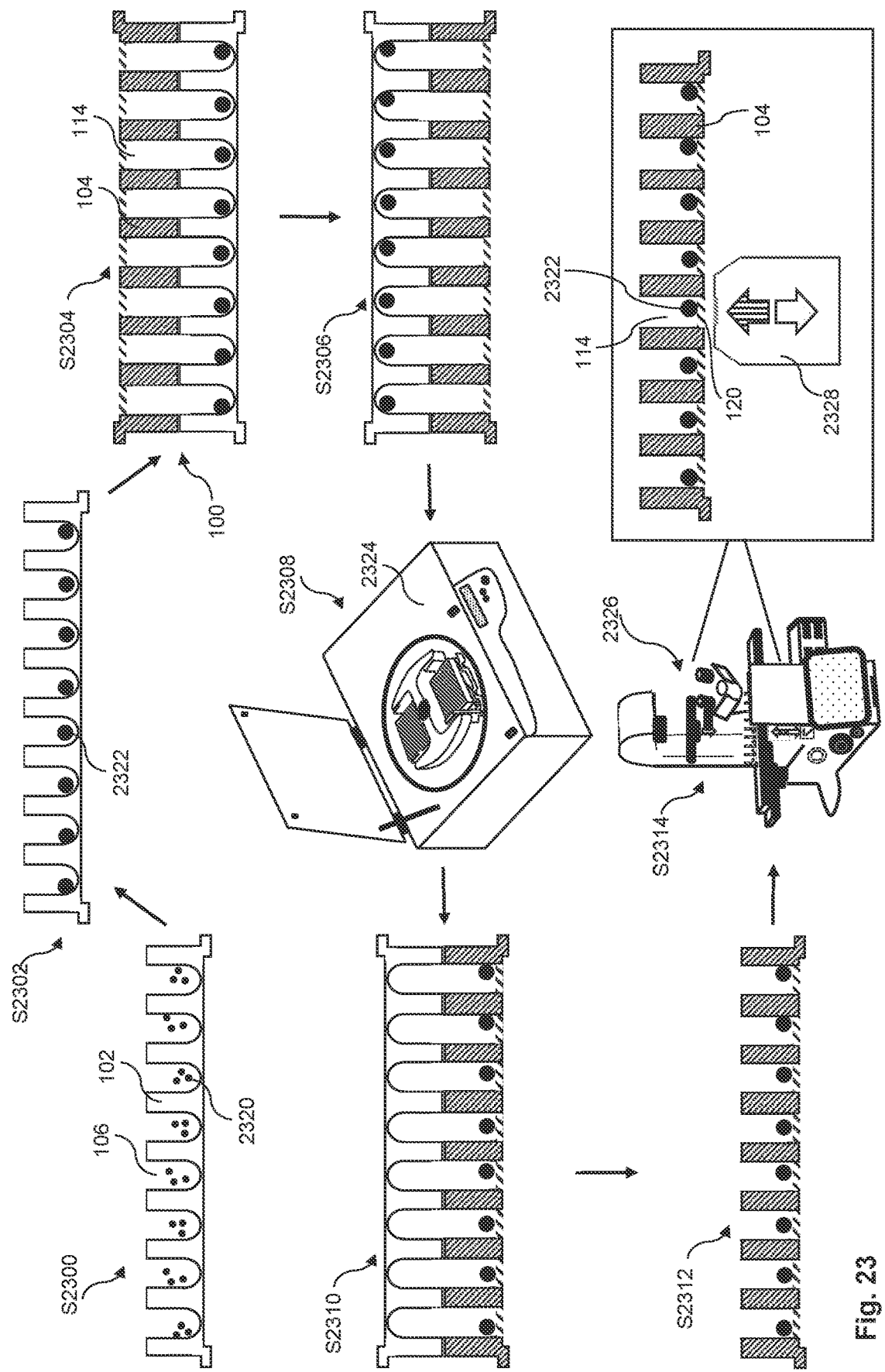
FIG. 23 is a flow chart of a method for transferring samples by means of the microplate assembly.

FIG. 23 shows a flow chart with the steps of a method for transferring samples by means of the microplate assembly 100. In a first step indicated by reference sign S2300, the sample donor cavities 106 of the donor microplate 102 are filled with a liquid growth medium and inoculated with a small number of cells 2320.

In a step S2302 the microplate 102 is incubated for a period of time at incubation conditions causing the cells 2320 to form spheroids 2322 or organoids. The spheroids 2322 are also called samples and consist of a cluster of multiple cells of either a single type or of a range of different types.

In a step S2304 the top side 118 of the receiver microplate 104 is placed on the top side 108 of the donor microplate 102, such that the cavities 106, 114 are aligned in pairwise connection. This forms the microplate assembly 100.

In some embodiments of the receiver a microplate according to FIGS. 18 to 22 can be used, or variations thereof. In a further alternative, the receiver microplate 104 may be placed on the donor microplate 102 immediately after inoculation in step S2300. In addition, an embodiment of the clamping device according to FIGS. 10 to 15 can be used.

In a step S2306 the assembly 100 is turned upside down, such that the receiver microplate 104 is below the donor microplate 102. In a step S2308 the microplate assembly 100 is placed in a centrifuge 2324 and centrifuged to move the spheroids 2322 from the donor cavities 106 of the microplate 102 to the receiver cavities 114 of the receiver microplate 104. In a step S2310 the microplate is removed from the centrifuge 2324.

Alternatively to the steps S2308 and S2310, the spheroids 2322 can be moved from the donor microplate 102 to the receiver microplate 104 through gravity, without centrifugation. The inner surface of the donor cavities 106 of the donor microplate 102 can comprise a low-attachment coating to facilitate the detachment of spheroids 2322 from the cavities 106.

In a step S2312 the donor microplate 102 is removed from the receiver microplate 104. Alternatively, the donor microplate 102 can remain on the receiver microplate 104.

In a step S2314 the receiver microplate 104 is placed on a stage of a microscope 2326, in particular an inverted microscope. This allows analysing, in particular imaging, the spheroids 2322 through the transparent bottom 120 of the cavity 114 by means of an objective 2328 of the microscope 2326, in particular, with a high numerical aperture objective.

The steps S2300 to S2314 can either be carried out manually or the steps can be automated, for example, by means of a laboratory robot.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Microplate assembly
102 Donor microplate
104, 1900, 2000,
2100, 2200 Receiver microplate
106 Sample donor cavity
108 Top side of donor microplate
110 Donor opening
112 Donor bottom
114, 2002, 2202 Sample receiver cavity
116, 2004 Receiver opening
118 Top side of receiver microplate
120 Receiver bottom
122 Longitudinal axis of donor cavity
124, 2006 Longitudinal axis of receiver cavity
126, 300, 400, 500,
600, 800 Leak-tight connecting structure
128 Gasket
302, 402, 502, 804 Protrusion
304, 404, 504, 602 Recess
604, 806 O-ring
1000, 1100, 1300,
1400 Clamping device
1002, 1004 Flank
1102, 1104 Magnetic element
1302, 1304, 1402,
1404 Threaded fastener
1306, 1308, 1410,
1412 Clamping element
1406, 1408 Fastening means
1600, 1700 Adapter
1602, 1702 Adapter channel
1704 Adapter plug
2102 Connection element
2204 Line of sectional view
2320 Cell
2322 Spheroid
2324 Centrifuge
2326 Microscope
2328 Objective
S2300 to S2314 Method steps

The invention claimed is:

1. A microplate assembly for a plurality of samples, the microplate assembly comprising:
a donor microplate including a plurality of sample donor cavities with donor cavity openings, the plurality of sample donor cavities for receiving the plurality of samples for cultivation;
a receiver microplate including a plurality of sample receiver cavities with receiver cavity openings, the plurality of sample receiver cavities for receiving the plurality of samples for microscopic imaging, each sample receiver cavity having a transparent receiver bottom configured to enable the microscopic imaging; and
a leak-tight connecting structure configured to assemble the donor microplate and the receiver microplate, wherein, in an assembled state, the receiver cavity openings face the donor cavity openings, so that at least one sample donor cavity of the plurality of sample donor cavities is in fluid communication with at least one sample receiver cavity of the plurality of sample receiver cavities for transferring a sample of the plurality of the samples from the at least one sample donor cavity to the at least one sample receiver cavity.

2. The microplate assembly according to claim 1, wherein the sample donor cavities and the sample receiver cavities are aligned in pairs to each other in the assembled state.

3. The microplate assembly according to claim 1, wherein a longitudinal axis of at least one sample receiver cavity is aligned with a longitudinal axis of at least one communicating sample donor cavity.

4. The microplate assembly according to claim 1, wherein a longitudinal axis of at least one sample receiver cavity is laterally shifted relative to a longitudinal axis of at least one communicating sample donor cavity.

5. The microplate assembly according to claim 1, wherein at least two of the sample receiver cavities are interconnected through a connection element to allow fluid exchange between the at least two sample receiver cavities.

6. The microplate assembly according to claim 5, wherein the connection element is a microfluidic chip integrated into the receiver microplate.

7. The microplate assembly according to claim 1, wherein the leak-tight connecting structure comprises a seal arranged around the receiver cavity openings of the sample receiver cavities.

8. The microplate assembly according to claim 1, wherein the leak-tight connecting structure comprises protrusions and corresponding recesses, each protrusion being located around one of the donor cavity opening of a respective sample donor cavity or the receiver cavity opening of a respective sample receiver cavity, and each recess being located around the other one of the donor cavity opening and the receiver cavity opening.

9. The microplate assembly according to claim 1, wherein the leak-tight connecting structure comprises an adapter configured to be sandwiched between the donor microplate and the receiver microplate, the adapter comprising adapter channels configured to bring at least one of the sample donor cavities in communication with at least one of the sample receiver cavities.

10. The microplate assembly according to claim 9, wherein the adapter is configured to block communication between some of the sample donor cavities and some of the sample receiver cavities.

11. The microplate assembly according to claim 1, wherein the leak-tight connecting structure comprises a clamping device configured to press the donor microplate and the receiver microplate against each other.

12. The microplate assembly according to claim 11, wherein the clamping device comprises at least two magnetic elements configured to apply a magnetic force for pressing the donor microplate and the receiver microplate against each other.

13. The microplate assembly according to claim 1, wherein each of the plurality of sample donor cavities comprises a donor bottom having a rounded inner surface.

14. A receiver microplate for a microplate assembly, the receiver microplate comprising:
a plurality of sample receiver cavities with receiver cavity openings, each sample receiver cavity having a transparent receiver bottom configured to enable the microscopic imaging; and
a leak-tight connecting structure element configured to connect the receiver microplate with a donor microplate of the microplate assembly such that, in a connected state, the receiver cavity openings face donor cavity openings of a plurality of sample donor cavities of the donor microplate, so that at least one sample receiver cavity of the plurality of sample receiver cavities is in fluid communication with at least one sample donor cavity of the plurality of sample donor cavities of the donor microplate for transferring a sample from the at least one sample donor cavity to the at least one sample receiver cavity.

15. A method for transferring samples by a microplate assembly, the microplate assembly comprising:
a donor microplate including a plurality of sample donor cavities with donor cavity openings, the plurality of sample donor cavities for receiving the plurality of samples for cultivation;
a receiver microplate including a plurality of sample receiver cavities with receiver cavity openings, the plurality of sample receiver cavities for receiving the plurality of samples for microscopic imaging, each sample receiver cavity having a transparent receiver bottom configured to enable the microscopic imaging; and
a leak-tight connecting structure configured to assemble the donor microplate and the receiver microplate, wherein, in an assembled state, the receiver cavity openings face the donor cavity openings, so that at least one sample donor cavity of the plurality of sample donor cavities is in fluid communication with at least one sample receiver cavity of the plurality of sample receiver cavities for transferring a sample of the plurality of the samples from the at least one sample donor cavity to the at least one sample receiver cavity,
the method comprising:
culturing the samples in the sample donor cavities of the donor microplate;
assembling the microplates and the leak-tight connecting structure such that at least one of the sample donor cavities is in communication with at least one of the sample receiver cavities; and
transferring the samples from the sample donor cavities to the sample receiver cavities.

16. The method according to claim 15, wherein the samples are transferred to the sample receiver cavities by a centrifuge.

17. The method according to claim 15, wherein the samples transferred into the receiver microplate are observed by a microscope.

* * * * *